(12) United States Patent
Doi et al.

(10) Patent No.: US 11,195,405 B2
(45) Date of Patent: Dec. 7, 2021

(54) DOZING ALERT APPARATUS

(71) Applicant: DENSO CORPORATION, Kariya (JP)

(72) Inventors: Atsuhiro Doi, Kariya (JP); Mitsutoshi Nagata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/883,803

(22) Filed: May 26, 2020

(65) Prior Publication Data

US 2020/0286358 A1 Sep. 10, 2020

Related U.S. Application Data

(63) Continuation of application No. PCT/JP2018/038668, filed on Oct. 17, 2018.

(30) Foreign Application Priority Data

Dec. 21, 2017 (JP) .............................. JP2017-244998

(51) Int. Cl.
*G08B 21/06* (2006.01)
*B60W 40/09* (2012.01)
*B60W 50/14* (2020.01)
*B60Q 9/00* (2006.01)
(Continued)

(52) U.S. Cl.
CPC .............. *G08B 21/06* (2013.01); *B60Q 9/00* (2013.01); *B60W 40/09* (2013.01); *B60W 50/14* (2013.01); *G06K 9/00335* (2013.01); *G06K 9/00845* (2013.01); *B60W 2040/0809* (2013.01);
(Continued)

(58) Field of Classification Search
CPC ......... G08B 21/06; B60Q 9/00; B60W 40/09;
B60W 50/14; B60W 2540/229; B60W 2040/0809; B60W 2040/0827; B60W 2050/143; G06K 9/00335; G06K 9/00845; B60K 28/06; B60R 11/04
See application file for complete search history.

(56) References Cited

U.S. PATENT DOCUMENTS

| 5,694,116 A | 12/1997 | Kojima |
| 2003/0181822 A1* | 9/2003 | Victor .................... A61B 5/11 600/558 |
| 2008/0204256 A1 | 8/2008 | Omi |

(Continued)

FOREIGN PATENT DOCUMENTS

| JP | S56-2227 A | 1/1981 |
| JP | H09-132052 A | 5/1997 |

(Continued)

OTHER PUBLICATIONS

English Translation of the Abstractor JP-2008204056-A, Jun. 14, 2014.*

*Primary Examiner* — Sisay Yacob
(74) *Attorney, Agent, or Firm* — Harness, Dickey & Pierce, P.L.C.

(57) ABSTRACT

A drowsiness level of a driver in a vehicle is determined. A preliminary alert is performed in response to that the drowsiness level is higher than an alert threshold value. A main alert is performed to prompt the driver to wake up from drowsiness as necessary after the preliminary alert. In response to that a predetermined response operation by the driver is detected within a predetermined time after the preliminary alert, the alert threshold value is changed to be higher.

18 Claims, 4 Drawing Sheets

(51) Int. Cl.
  *G06K 9/00* (2006.01)
  *B60W 40/08* (2012.01)
(52) U.S. Cl.
  CPC ............... *B60W 2040/0827* (2013.01); *B60W 2050/143* (2013.01); *B60W 2540/229* (2020.02)

(56) References Cited

U.S. PATENT DOCUMENTS

2010/0214087 A1* 8/2010 Nakagoshi ........... B60K 28/066
  340/436
2016/0297449 A1* 10/2016 Heim .................... B60W 30/09

FOREIGN PATENT DOCUMENTS

| JP | 2002183900 A |   | 6/2002  |
|----|--------------|---|---------|
| JP | 2008204056 A | * | 9/2008  |
| JP | 2008206688 A |   | 9/2008  |
| JP | 2016199207 A |   | 12/2016 |

\* cited by examiner

DOZING ALERT APPARATUS

CROSS REFERENCE TO RELATED APPLICATIONS

The present application is a continuation application of International Patent Application No. PCT/JP2018/038668 filed on Oct. 17, 2018, which designated the U.S. and claims the benefit of priority from Japanese Patent Application No. 2017-244998 filed on Dec. 21, 2017. The entire disclosures of all of the above applications are incorporated herein by reference.

TECHNICAL FIELD

The present disclosure relates to a dozing alert apparatus mounted on a vehicle such as an automobile, a truck, a bus, for preventing a driver from falling asleep.

BACKGROUND

A dozing alert apparatus for preventing a driver from falling asleep is provided, as follows. That is, the driver's face is photographed by a camera, and the drowsiness level of the driver is estimated from the change in the degree of opening of the driver's eyelids and/or the change in the blink pattern by image processing. Then, when the drowsiness level exceeds a threshold value, a preliminary alert is issued. This preliminary alert is performed by outputting white noise from a speaker. In response to generation of the white noise as a preliminary alert, the apparatus is configured to determine the response of the driver to the white noise, or the response of the driver from the change in the expression, the face, or the line of sight of the driver. If the driver's response is detected within the grace period, the generation of the main alert is postponed. If the driver's response is not detected even after the grace period has elapsed, the main alert is generated.

SUMMARY

According to an example of the present disclosure, a drowsiness level of a driver in a vehicle is determined. A preliminary alert is performed in response to that the drowsiness level is higher than an alert threshold value. A main alert is performed to prompt the driver to wake up from drowsiness as necessary after the preliminary alert. In response to that a predetermined response operation by the driver is detected within a predetermined time after the preliminary alert, the alert threshold value is changed to be higher.

BRIEF DESCRIPTION OF DRAWINGS

The objects, features and advantages of the present disclosure will become more apparent from the following detailed description made with reference to the accompanying drawings. In the drawings.

DETAILED DESCRIPTION

Figure 1:
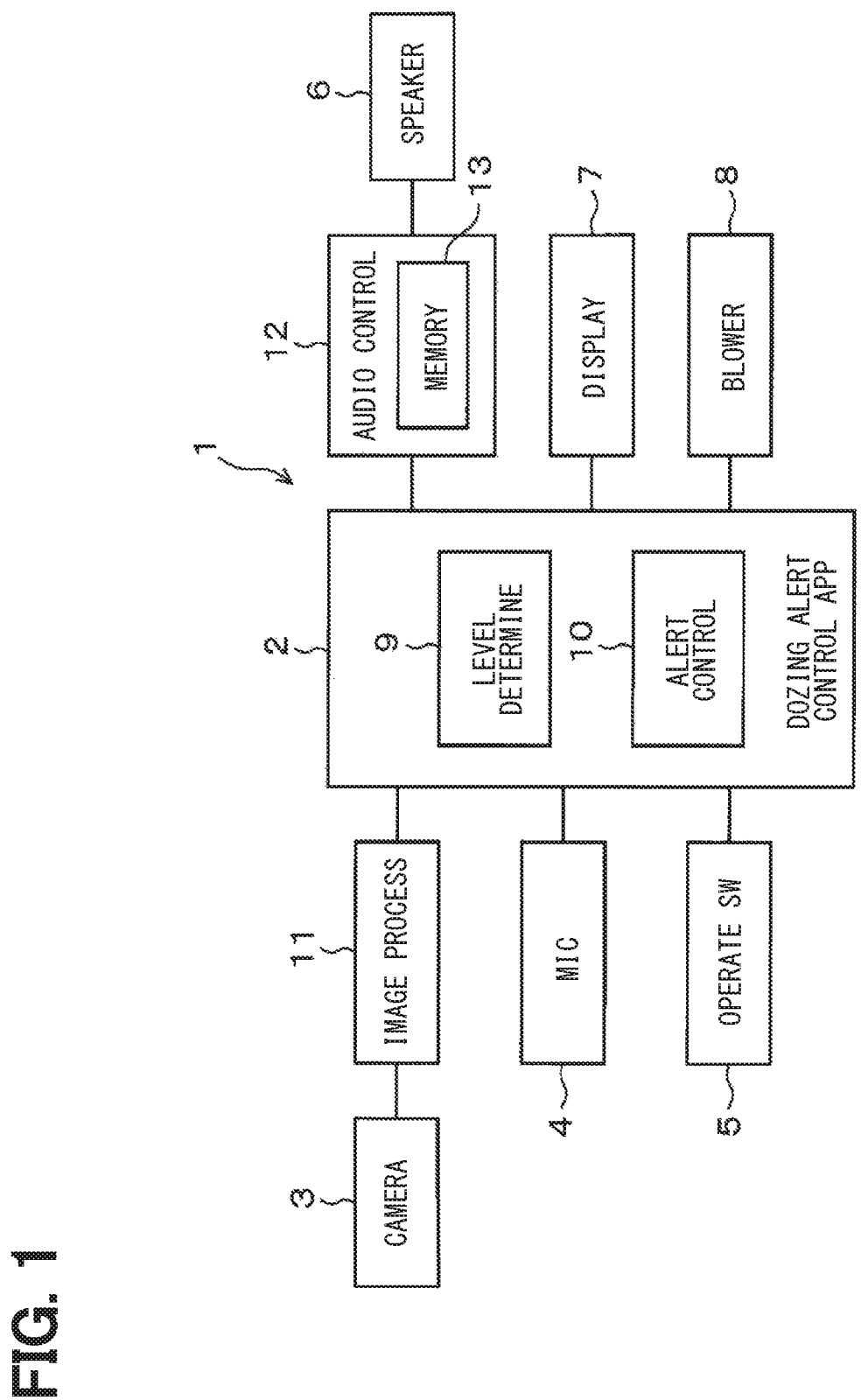
FIG. 1 is a block diagram schematically showing an electric configuration of a dozing alert apparatus according to an embodiment.
Figure 2:
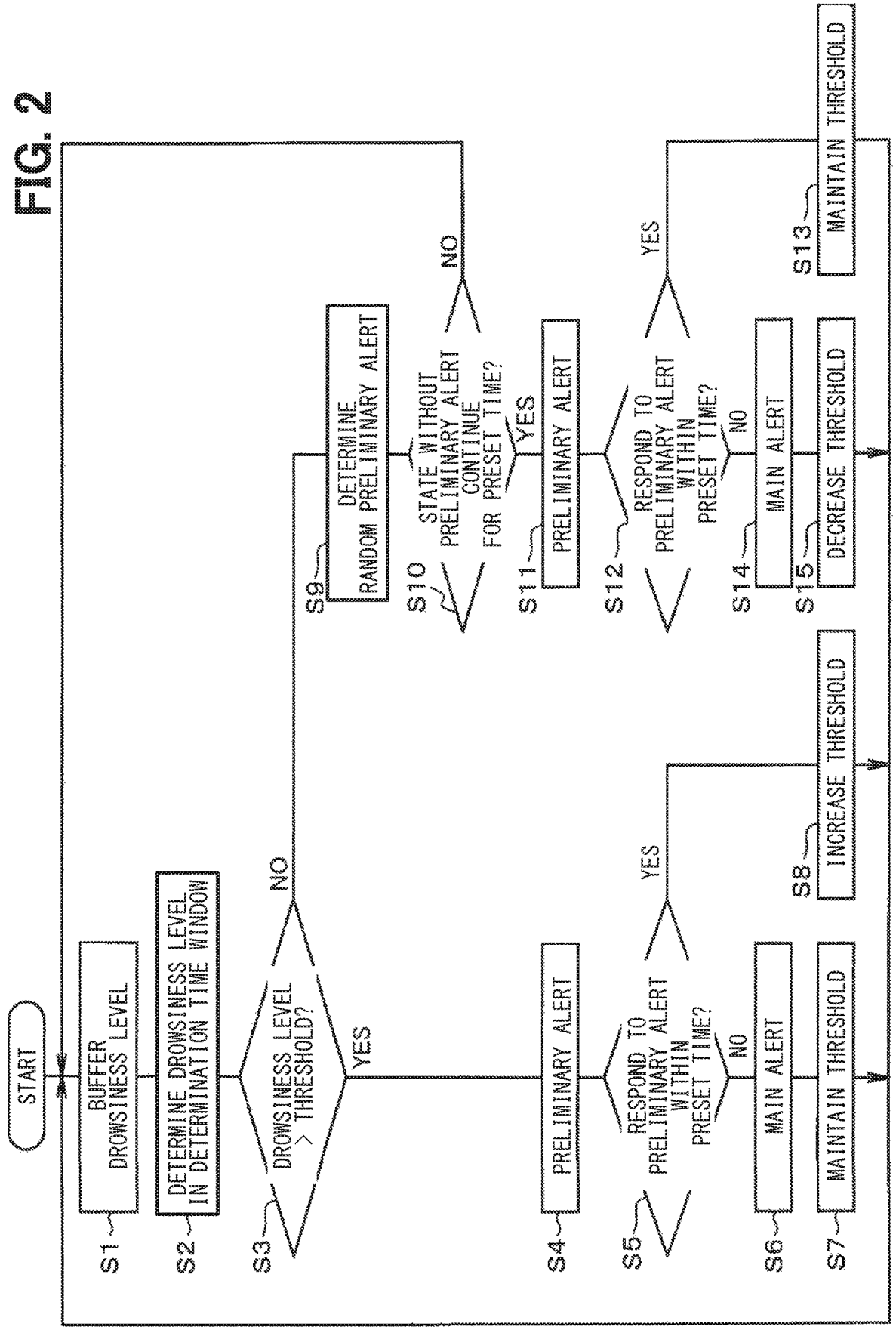
FIG. 2 is a flowchart illustrating a processing procedure of a dozing alert performed by a control apparatus.
Figure 3:
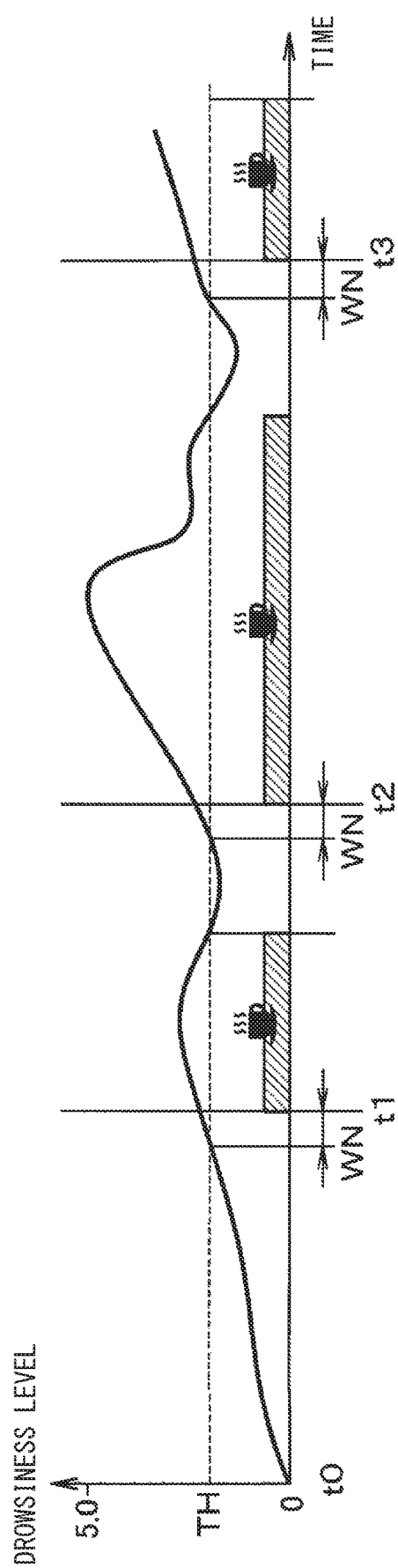
FIG. 3 is a diagram showing an example of how the drowsiness level changes over time.

Hereinafter, an embodiment will be described with reference to FIGS. 1 to 3. FIG. 1 schematically shows an electrical configuration of a dozing alert apparatus 1 according to the present embodiment. The dozing alert apparatus 1 is mounted on a vehicle such as an automobile, a bus, a truck. The dozing alert apparatus 1 includes a dozing alert control apparatus 2, and other components communicatively connected with the dozing alert control apparatus 2. The other components include a camera 3, a microphone 4, an operation switch unit 5, a speaker 6, a display device 7, a blower device 8.

The dozing alert control apparatus 2 may be configured by including one or more computers. As an example of the present embodiment, the dozing alert control apparatus 2 includes a computer that includes a central processing unit (CPU), a ROM, a RAM, and the like, and controls each function by executing a dozing determination alert program to realize the functions as the dozing alert apparatus 1.

Here, the dozing alert control apparatus 2 is configured to include a drowsiness level determination unit 9 and an alert control unit 10. Further, the drowsiness level determination unit 9 includes a threshold value change unit; the alert control unit 10 includes a preliminary alert unit, an alert unit, a response detection unit, and a random preliminary alert unit. The drowsiness level determination unit 9 is configured to determine a drowsiness level of the driver. The preliminary alert unit is configured to perform a preliminary alert in response to that the drowsiness level is higher than an alert threshold value based on comparing the drowsiness level determined by the drowsiness level determination unit 9 with the alert threshold value. The alert unit is configured to perform a main alert that prompts the driver to wake up from drowsiness as necessary after the preliminary alert by the preliminary alert unit. The response detection unit is configured to detect that the driver has performed a predetermined response operation within a predetermined time after the preliminary alert is performed by the preliminary alert unit. The threshold value change unit is configured to change the alert threshold value to be higher in response to that the predetermined response operation is detected by the response detection unit.

The camera 3 is provided, for example, near a meter unit in the front of the driver's seat in the passenger compartment, and photographs the driver's face, for example, upward from the chest. The camera 3 is controlled by the image processing unit 11; photographing data by the camera 3 is input to the image processing unit 11 to perform image processing. The image data processed by the image processing unit 11 is input to the dozing alert control apparatus 2.

The microphone 4 is used by a driver to input a speech, and is provided near a driver's seat. The operation switch unit 5 is operated by a driver, and includes, for example, a plurality of mechanical switches and a touch panel. The operation switch unit 5 is provided near the driver's seat, such as the center console and steering wheel. The signals from the microphone 4 and the operation switch unit 5 are also input to the dozing alert control apparatus 2.

The speaker 6 is provided in the passenger compartment and outputs sounds, and is controlled by an audio control unit 12. As described later, the audio control unit 12 causes the speaker 6 to output sounds for the alert based on a command from the dozing alert control apparatus 2. At this time, an audio memory 13 in which speech data used for a preliminary alert described later is stored is detachably set in the audio control unit 12. The audio memory 13 uses a serial flash memory or an SD card, for instance.

The display device 7 is provided in, for example, a center console and performs various displays to a driver. Based on a command from the dozing alert control apparatus 2, a necessary display relating to the dozing alert is performed. The display device 7 and the operation switch unit 5 may be integrally unitized. The blower device 8 is used as another device when a main alert described below is performed. For example, the blower device 8 sends fragrance or cool air from the backrest or headrest part of the driver's seat toward the driver's face to encourage the driver to wake up. The blower device 8 operates in cooperation based on a command from the dozing alert control apparatus 2.

Further, in the present embodiment, as will be described later in the operation description, the drowsiness level determination unit 9 in the dozing alert control apparatus 2 determines the level of drowsiness of the driver. Based on comparing the drowsiness level with the alert threshold value TH (see FIG. 3), it is determined whether the drowsiness level is higher than the alert threshold value TH. When the drowsiness level exceeds the alert threshold value TH, that is, when the alert determination flag becomes valid, the alert control unit 10 performs a preliminary alert.

Then, the alert control unit 10 determines whether the driver has performed a predetermined response operation within a preset time after the preliminary alert is issued. When a response operation is not detected within the preset time, the main alert is performed to urge the driver to awaken from drowsiness. In contrast, when a response operation is detected within the preset time after the preliminary alert is issued, the drowsiness level determination unit 9 changes the alert threshold value TH to be higher.

More specifically, when the drowsiness level determination unit 9 determines the drowsiness level of the driver, the camera 3 takes an image of the driver's face. From the photographed image data, a change in the degree of opening of the driver's eyelids and/or a change in the blink pattern are obtained by image processing. The drowsiness level of the driver is determined based on the result. In this case, the drowsiness level is determined by a numerical value that increases as the degree of drowsiness increases, for example, a numerical value from 0.0 to 5.0. Since the method of determining the drowsiness level is a well-known technique, detailed description will be omitted.

The drowsiness level determination unit 9 compares the determined drowsiness level with the alert threshold value TH to determine whether the driver has a certain drowsiness. In such determination, the present embodiment uses the following method, for instance. That is, the determined drowsiness level is buffered at predetermined time intervals, for example, every second, to obtain the drowsiness level buffered in time series. In the drowsiness level buffered in time series, a predetermined width of determination time window data is obtained. In such a predetermined width of determination time window data, when all the drowsiness levels exceed the alert threshold value TH (for example, 3.0), the alert determination flag is made valid. When the alert determination flag becomes valid, it is determined that the driver has a certain drowsiness, and the alert control unit 10 performs a preliminary alert. In addition, even if the alert determination flag is continuously becomes valid, the next preliminary alert is performed with a preset time interval (for example, about several seconds to several tens of seconds) after performing the previous preliminary alert.

In the present embodiment, the preliminary alert is performed by asking the driver with an output of a speech based on the speech data. In this case, the alert control unit 10 outputs a command signal to the audio control unit 12. The audio control unit 12 reproduces the speech data stored in the audio memory 13 and causes the speaker 6 to output a speech for question. The wording of the question is, for example, "Are you tired?", "Have you been tired?" In this case, the speech data stored in the audio memory 13 can be rewritten. Instead of a synthesized speech or the like, a speech of a person who the driver knows, for example, a speech of a family member, a lover, a friend, a boss of a company, or the like can be used as the speech used for the preliminary alert.

When the driver who has heard the preliminary alert is in the awake state (has not much sleepiness), the driver performs a predetermined response operation within a preset time (for example, about several seconds) so as not to proceed to the main alert. Here, it is assumed that the driver performs a predetermined gesture as a response operation by the driver. For example, the driver makes a gesture of holding his/her hand in front of the camera 3, shaking his/her head up/down, shaking his/her head left/right, or opening his/her mouth. The alert control unit 10 detects whether a predetermined response operation has been performed, that is, whether any of the above-described gestures has been performed, based on image recognition based on image data captured by the camera 3.

The alert control unit 10 performs the main alert when a response operation by the driver, that is, a predetermined gesture is not detected even after a preset time has elapsed since the preliminary alert was issued. In this main alert, for example, a sound that awakens the driver, such as a beep sound, is output from the speaker 6. In the present embodiment, in addition to this, the scent or cool air is sent toward the driver's face by the blower device 8. Further, on the screen of the display device 7, a caution display is made, for example, to urge the driver to take a break.

On the other hand, when the alert control unit 10 detects a response operation by the driver within a preset time, the drowsiness level determination unit 9 changes the alert threshold value TH to be higher. As a result, at the next time the preliminary alert may be determined to be performed against a deeper drowsiness. Specifically, the numerical value of the alert threshold value TH is increased, for example, by 0.1. If the current alert threshold value TH is 3.0, the alert threshold value TH is set to 3.1 at the next time.

Further, suppose a case where a state in which the determination by the drowsiness level determination unit 9 is equal to or less than the alert threshold value TH (i.e., the state in which the alert determination flag remains invalid) may continue. In such a case, in the present embodiment, the dozing alert control apparatus 2 performs a random preliminary alert in response to that such a state has continued for a preset time or more, for example, 30 minutes or more. This random preliminary alert is also performed in the same manner as the above-mentioned preliminary alert. If the driver who has heard the preliminary alert performs a predetermined response operation, that is, a predetermined gesture within a preset time, the main alert is not performed. When the response operation by the driver is not detected, the main alert as described above is performed.

When the random preliminary alert is performed, the driver who has heard the preliminary alert may perform a predetermined response operation (gesture) within a preset time. In such a case, the alert threshold value TH is not increased, and the numerical value of the alert threshold value TH remains unchanged. Then, when the main alert is performed after the random preliminary alert, the drowsiness level determination unit 9 changes the alert threshold value TH so as to be lower. As a result, next time the preliminary alert is determined, the preliminary alert is issued against a lighter drowsiness. Specifically, the numerical value of the alert threshold value TH is reduced, for example, by 0.1. If the current alert threshold value TH is 3.0, the alert threshold value TH is set to 2.9 at the next time.

Next, the operation of the dozing alert apparatus 1 having the above configuration will be described with reference to FIGS. 2 and 3. The flowchart in FIG. 2 schematically illustrates a processing procedure for determining a drowsiness level of a driver and performing an alert by the dozing alert control apparatus 2 while the vehicle is running (while the ACC is on). That is, first, in step S1, the drowsiness level of the driver is determined and buffered: in step S2, the drowsiness levels with respect to a plurality of data within a predetermined width of a determination time window are determined. In step S3, it is determined whether all the drowsiness levels within the determination time window have exceeded the alert threshold value TH (for example, 3.0). If the drowsiness levels do not exceed the alert threshold value TH (No in step S3), the process proceeds to step S9 as described later.

When the drowsiness levels exceed the alert threshold value TH, that is, when the alert determination flag is valid (Yes in step S3), a preliminary alert is performed in step S4. As described above, this preliminary alert is issued by asking the driver by speech. Here, FIG. 3 shows an example of how the drowsiness level changes with time. Here, when the drowsiness level exceeding the alert threshold value TH continues for the determination time window WN, the alert determination flag becomes valid, and the preliminary alert is performed. In the case of FIG. 3, a preliminary alert is issued at time t1, time t2, and time t3. In addition, a segment indicated by hatching in FIG. 3 is a segment in which the alert determination flag is valid.

In next step S5, it is determined whether a predetermined response operation by the driver has not been performed within a preset time (for example, about several seconds). As described above, the response operation by the driver is one of predetermined gestures of (i) holding his/her hand in front of the camera 3, (ii) shaking his/her head up/down, (iii) shaking his/her head left/right, and (iv) opening a mouth (or opening/closing a mouth). In this case, if the driver is in a sufficiently awake state, it is possible to easily perform a response operation by listening to the speech of the preliminary alert, that is, the question. However, if the driver's drowsiness is great, a predetermined gesture may not be performed immediately even if the preliminary alert is heard.

If the predetermined gesture by the driver is not performed within a preset time after the preliminary alert is issued, it is determined that there is no response operation (No in step S5), and the main alert is generated in next step S6. In this main alert, as described above, an alert sound is output and air is blown to the driver's face, thereby prompting the driver to wake up. Further, in step S7, the alert threshold value TH is left as it is, and the processing from step S1 is repeated.

On the other hand, if there is a response operation by the driver within a preset time after the preliminary alert is issued (Yes in step S5), the process proceeds to step S8. The alert threshold value TH is changed to be higher than the current value by 0.1. As a result, the alert threshold value TH is changed to a higher value so that the determination of the preliminary alert from the next time will be issued against a deeper drowsiness. Further, at this time, the processing from step S1 is repeated without the main alert being issued.

Here, if the driver responds to the preliminary alert without difficulty, the driver is not so sleepy. It can be said that the alert threshold value TH that triggered the preliminary alert was relatively low from the driver's subjective view. In other words, when a response operation to the preliminary alert is detected, a preliminary alert with the subsequent alert threshold value set to be higher may be provided to be more matched to the driver's feeling. Therefore, by increasing the alert threshold value TH, the alert threshold value TH is corrected to a value suitable for the driver. If there is no detection of the driver's response operation to the preliminary alert, it can be said that the driver's drowsiness has advanced, and thus it can be said that the alert threshold value is appropriate.

In the present embodiment, a random preliminary alert is performed in addition to the preliminary alert based on the determination of the drowsiness level of the driver. That is, if the determined drowsiness level of the driver is a relatively low value that is equal to or less than the alert threshold value TH in step S3 described above (No in step S3), the processing in step S9 is performed. That is, to determine whether to perform a random preliminary alert, the time during which the state without the preliminary alert continues is counted. In next step S10, it is determined whether the state without a preliminary alert has continued for a preset time (for example, 30 minutes to 2 hours). If the state has not continued for a preset time or longer (No in step S10), the process returns to step S1.

On the other hand, if the state without the preliminary alert has continued for a preset time (Yes in step S10), in step S11, the preliminary alert is performed by asking by outputting a speech. In next step S12, it is determined whether a predetermined response operation by the driver, that is, a predetermined gesture has been performed within a preset time. In this case, in most cases, it is considered that if the driver is in the awake state, the driver can easily perform a response operation by listening to the speech (question) of the preliminary alert. If there is a response operation by the driver within a preset time after the preliminary alert is issued (Yes in step S12), the process proceeds to step S13. In step S13, the alert threshold value TH is left as it is, and the processing from step S1 is repeated.

However, when the driver has drowsiness, there may be a case where a predetermined gesture cannot be immediately performed even if the preliminary alert is heard. When the response operation by the driver has not been performed (No in step S12), the main alert is performed in step S14. Then, in next step S15, the alert threshold value TH is changed to be lower than the current value by 0.1. As a result, the alert threshold value TH is changed to be low so that the determination of the preliminary alert from the next time will be issued against a lighter drowsiness. Thereafter, the processing from step S1 is repeated.

Here, when the response operation by the driver to the random preliminary alert is not detected, it is considered that the driver's drowsiness has advanced. Nevertheless, the normal preliminary alert has not been performed before. From the driver's subjective view, the alert threshold value TH up to that point was thus too high. Therefore, by lowering the alert threshold value TH, the alert threshold value TH is corrected to a value suitable for the driver. When the response operation by the driver to the random preliminary alert is detected, it is considered that the driver is in the awake state, so the alert threshold value TH is considered to be appropriate.

As described above, according to the dozing alert apparatus 1 of the present embodiment, the following effects can be obtained. That is, in the present embodiment, the dozing alert control apparatus 2 determines the drowsiness level of the driver while driving the vehicle. When the alert threshold value TH is exceeded, that is, when the alert determination flag becomes valid, a preliminary alert is issued. At this time, within a preset time after the preliminary alert is issued, it is detected whether the driver has performed a predetermined response operation. When a response operation is detected, the alert threshold value TH is changed to be higher. Therefore, an excellent effect can be obtained in which the preliminary alert and the main alert can be appropriately performed at a drowsiness level more matched to the driver's feeling while driving the vehicle.

Further, in the present embodiment, a preliminary alert is also performed randomly at appropriate time even in the state where the alert determination flag remains invalid, or the state where a preliminary alert triggered by the determination of the driver's drowsiness level or a comparison with the alert threshold value TH, is not performed. In addition, when a predetermined response operation by the driver to the preliminary alert is not detected, the main alert is performed to urge the driver to wake up, and the alert threshold value TH is changed to be lower. Therefore, it is possible to further appropriately set the alert threshold value TH. In addition, the random preliminary alert is performed in response to that the preliminary alert has not been performed for a preset time or more. Therefore, it is possible to prevent the frequency at which the random preliminary alert is performed from occurring too much to make the driver feel troublesome; by contrast, it is possible to prevent the frequency from being too low to cause the preliminary alert to be meaningless.

In particular, in the present embodiment, the preliminary alert is configured to ask the driver by the speech output based on speech data. Thereby, it is possible to give a stimulus to the driver by asking in the preliminary alert, and to return to the awake state or to maintain the awake state. In this case, the speech data is configured to be rewritable. Thereby, for example, the speech of a person who knows the driver, for example, the speech of a family member, a lover, a friend, the boss of a company, or the like can also be used as the speech for the preliminary alert. The driver can thus be provided with a sense of security and stimulation, and a more effective preliminary alert can be issued.

Further, in the present embodiment, in particular, a predetermined gesture is adopted as a predetermined response operation by the driver to the preliminary alert. Accordingly, the response operation by the driver can be easily completed, and the awake state of the driver can be maintained by performing the gesture. Further, in the present embodiment, a speech alert is issued as the main alert for urging the driver to wake up from drowsiness. In addition to this, it is possible to appeal to the driver's tactile sensation or the like by cooperating with another device (e.g., the blower device 8). It is even more effective to encourage arousal.

Figure 4:
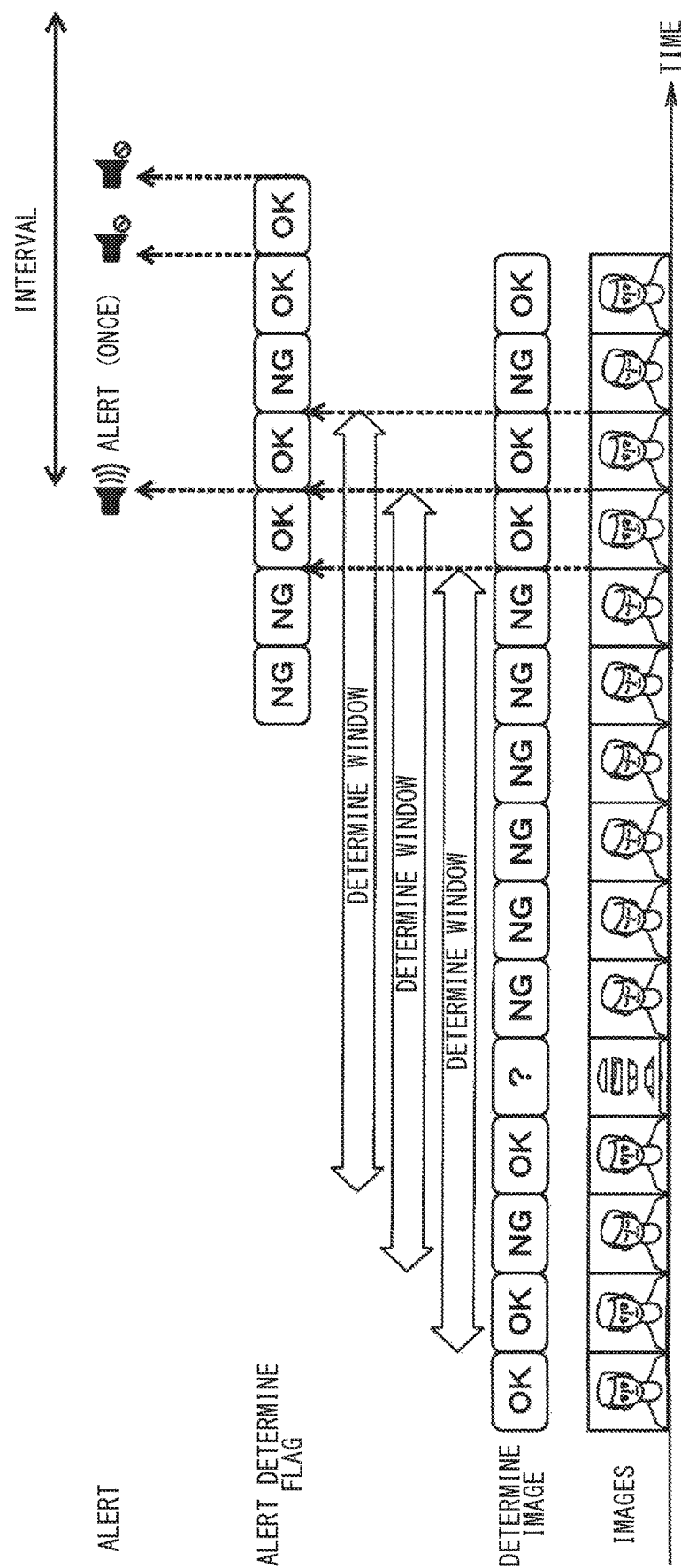
FIG. 4 is a diagram for explaining another method for determining whether the alert determination flag is valid or invalid according to another embodiment.

FIG. 4 shows another embodiment. The present embodiment is different from the above embodiment in a method of determining whether the drowsiness level of the driver determined by the drowsiness level determination unit 9 has exceeded the alert threshold value TH (i.e., a method of determining whether the alert determination flag is valid or invalid). That is, also in the present embodiment, the drowsiness level determined by the drowsiness level determination unit 9 from the captured image of the driver's face is buffered in a time series at regular intervals, for example, every second. FIG. 4 illustrates the drowsiness level determination data. In FIG. 4, "OK" indicates that there is no drowsiness, that is, a state in which the drowsiness level is determined to be equal to or less than the alert threshold value TH. "NG" indicates a state in which the drowsiness level exceeds the alert threshold value TH to be determined to be drowsy. "?" Indicates a state in which a determination cannot be made, for example, the driver's face could not be detected.

Then, at every output cycle (in this case, 1 second), the data is traced back by the data of a predetermined determination time window (in FIG. 4, by a predetermined data number, e.g., 10 as the determination time window). The total time of "NG" is obtained. When the total time of "NG" is equal to or greater than a time threshold value (for example, 12 seconds), the alert determination flag is made valid and a preliminary alert is issued. Even with such a configuration, a preliminary alert can be performed as in the above embodiment. Suppose a case where the alert determination flag is continuously valid. Even in such a case, for example, after the previous preliminary alert is performed, the preliminary alert is performed at intervals of, for example, several seconds to several tens of seconds.

In addition, although illustration is omitted, the following changes are also possible as an embodiment. That is, in the above embodiment, the alert threshold value TH is changed only by detecting the response operation to the normal preliminary alert once (steps S5 and S8 in FIG. 2). The configuration may however be such that the alert threshold value TH is changed when a response operation is detected a plurality of times (for example, twice) consecutively to the preliminary alert. According to this, detecting only one response operation does not lead to changing the alert threshold value TH. Therefore, it is possible to exclude that the alert threshold value TH is changed due to, for example, one accidental occurrence. The change in the alert threshold value TH is performed more appropriately.

In the above embodiment, the gesture is adopted as the predetermined response operation by the driver to the preliminary alert. A response with a predetermined speech may be performed as a response operation. It may be configured to detect whether a predetermined response operation has been performed based on the recognition of the speech acquired by the microphone 4. According to this, as a response operation to the preliminary alert, the driver performs a predetermined response by speech (for example, "OK", "not tired", etc.). As a result, a conversation is established, and the driver's awake state can be maintained by the stimulation of the conversation. As a response operation, the driver may perform a predetermined operation on the operation switch unit.

In the above embodiment, when the preliminary alert has not been performed for a preset time or more, the random preliminary alert is performed. However, the configuration may be such that the driver can change the preset time. This makes it possible to set the timing (time interval) at which the random preliminary alert is performed in accordance with circumstances such as a driver's preference and necessity. Further, in the above-described embodiment, the main alert uses another device such as a blower device 8 providing blower. Such another device may include a vibration device that is provided on the back portion of the seat or the steering wheel and applies vibration to the driver; a device that provides the driver's seat belt fastening force; a lighting device that provides light stimulation such as illumination; and a head-up display that displays on the windshield to encourage awakening.

When one vehicle is driven by a plurality of drivers, it is preferable to provide an alert threshold value TH for each driver. In this case, the alert threshold value TH is set and stored for each driver. At the start of driving, a driver identification unit that identifies the driver by authentication of face, fingerprint, palm print, etc. is provided. The alert threshold value TH for the driver identified by the driver identification unit can be read and used. In addition, in the above embodiment, the numerical values of the drowsiness level, the numerical value of the alert threshold value TH, and the numerical values of each time are merely examples, and various changes can be made. The method of determining drowsiness of the driver, the mode of the preliminary alert, the mode of the main alert, and the like can be appropriately changed and performed.

While the present disclosure has been described with reference to the embodiments thereof, it is to be understood that the disclosure is not limited to the embodiments and constructions. The present disclosure encompasses various modifications and variations within the scope of equivalents. In addition, various combinations and forms, and further, other combinations and forms including only one element, or more or less than these elements are also within the scope and the scope of the present disclosure.

For reference to further explain features of the present disclosure, the description is added as follows.

Another dozing alert apparatus is provided for preventing a driver from falling asleep, as follows. That is, the driver's face is photographed by a camera, and the drowsiness level of the driver is estimated from the change in the degree of opening of the driver's eyelids and/or the change in the blink pattern by image processing. Then, when the drowsiness level exceeds a threshold value, a preliminary alert is issued. This preliminary alert is performed by outputting white noise from a speaker. In response to generation of the white noise as a preliminary alert, the apparatus is configured to determine the response of the driver to the white noise, or the response of the driver from the change in the expression, the face, or the line of sight of the driver. If the driver's response is detected within the grace period, the generation of the main alert is postponed. If the driver's response is not detected even after the grace period has elapsed, the main alert is generated. This can reduce the occurrence of unnecessary alerts.

The driver's drowsiness is affected by individual differences, physical condition, mental state, and the like, and the estimation result does not always match the driver's subjective view. In the dozing alert apparatus having the above-described configuration, there is a possibility that the threshold value of the drowsiness level at which the preliminary alert is generated does not match the driver's subjective view.

For some drivers, a preliminary alert is issued in a state where drowsiness has advanced, so the driver feels that the timing of the alert is too late. In contrast, for another driver, a preliminary alert is issued in a state where the driver is fully awake, and the driver thus feels troublesome.

It is thus desired to provide a dozing alert apparatus that can appropriately perform an alert at a drowsiness level that more closely matches the driver's sense of sleepiness.

An aspect of the present disclosure described herein is set forth in the following clauses.

According to an aspect of the present disclosure, a dozing alert apparatus is provided to be mounted on a vehicle for preventing a driver from falling asleep. The dozing alert apparatus includes: a drowsiness level determination unit; a preliminary alert unit; an alert unit; a response detection unit; and a threshold value change unit. The drowsiness level determination unit is configured to determine a drowsiness level of the driver. The preliminary alert unit is configured to perform a preliminary alert in response to that the drowsiness level is higher than an alert threshold value based on comparing the drowsiness level determined by the drowsiness level determination unit with the alert threshold value. The alert unit is configured to perform a main alert that prompts the driver to wake up from drowsiness as necessary after the preliminary alert by the preliminary alert unit. The response detection unit is configured to detect that the driver has performed a predetermined response operation within a predetermined time after the preliminary alert is performed by the preliminary alert unit. The threshold value change unit is configured to change the alert threshold value to be higher in response to that the predetermined response operation is detected by the response detection unit.

According to the above configuration, the drowsiness level determination unit determines the drowsiness level of the driver. When the drowsiness level rises above the alert threshold value, a preliminary alert is performed by the preliminary alert unit. The response detection unit detects that the driver has performed a predetermined response operation within a preset time after the preliminary alert is issued by the preliminary alert unit. Thereby, the threshold value change unit changes the alert threshold value to be higher. In contrast, after the preliminary alert by the preliminary alert unit, the response detection unit does not detect that the driver has performed a predetermined response operation. Thereby, the alert unit performs a main alert that prompts the driver to wake up from drowsiness. At this time, the threshold value is not changed by the threshold value change unit, and the alert threshold value is kept as it is.

If the driver responds to the preliminary alert, the driver is not sleepy. It can be said that the alert threshold value that triggered the preliminary alert was relatively low from the driver's subjective view. In other words, when the response detection unit detects the response, a preliminary alert with the subsequent alert threshold value set to be higher may be provided to be more matched to the driver's feeling. When the response detection unit detects no response, the driver's drowsiness may have advanced, so it can be said that the alert threshold value is appropriate. At this time, the alert unit performs the main alert and urges the driver to wake up. Therefore, it is possible to make the alert threshold value more appropriate for the level of the driver's drowsiness while driving the vehicle. It is possible to appropriately issue an alert at the drowsiness level that more closely matches the driver's feeling.

What is claimed is:

1. A dozing alert apparatus mounted on a vehicle for preventing a driver from falling asleep, comprising:
   a drowsiness level determination unit configured to determine a drowsiness level of the driver;
   a preliminary alert unit configured to perform a preliminary alert in response to that the drowsiness level is higher than an alert threshold value based on comparing the drowsiness level determined by the drowsiness level determination unit with the alert threshold value;
   an alert unit configured to perform a main alert that prompts the driver to wake up from drowsiness as necessary after the preliminary alert performed by the preliminary alert unit;

a response detection unit configured to detect that the driver has performed a predetermined response operation within a preset time after the preliminary alert is performed by the preliminary alert unit;

a threshold value change unit configured to change the alert threshold value to be higher in response to that the predetermined response operation is detected by the response detection unit; and a random preliminary alert unit configured to perform the preliminary alert randomly in a state where the drowsiness level determined by the drowsiness level determination unit is equal to or less than the alert threshold value, wherein the threshold value change unit is configured to lower the alert threshold value in response to that the predetermined response operation by the driver is not detected by the response detection unit within a preset time after the preliminary alert performed randomly.

2. The dozing alert apparatus according to claim 1, wherein:

the threshold value change unit is configured to change the alert threshold value in response to that the response detection unit detects a plurality of response operations consecutively.

3. The dozing alert apparatus according to claim 1, wherein:

the preliminary alert unit is configured to perform the preliminary alert by asking the driver with an output of a speech based on speech data.

4. The dozing alert apparatus according to claim 3, wherein:

the speech data is configured to be rewritable.

5. The dozing alert apparatus according to claim 1, wherein:

the predetermined response operation by the driver to the preliminary alert includes a predetermined gesture; and the response detection unit is configured to detect whether the predetermined response operation has been performed based on image recognition by the camera.

6. The dozing alert apparatus according to claim 1, wherein:

the predetermined response operation by the driver to the preliminary alert includes a predetermined speech response; and the response detection unit is configured to detect whether the predetermined response operation has been performed based on recognition of a speech acquired by a microphone.

7. The dozing alert apparatus according to claim 1, wherein:

the random preliminary alert unit is configured to perform the preliminary alert randomly in response to that the preliminary alert has not performed for a preset time or more; and the preset time is enabled to be changed.

8. The dozing alert apparatus according to claim 1, wherein:

the alert unit is configured to perform the main alert that prompts the driver to wake from drowsiness in cooperation with another device mounted on the vehicle.

9. The dozing alert apparatus according to claim 1, further comprising:

a driver identification unit configured to identify the driver, wherein the alert threshold value is set for the identified driver.

10. A dozing alert apparatus mounted on a vehicle for preventing a driver from falling asleep, comprising:

one or more computers configured to determine a drowsiness level of the driver;

to perform a preliminary alert in response to that the drowsiness level is higher than an alert threshold value based on comparing the determined drowsiness level with the alert threshold value;

to perform a main alert that prompts the driver to wake up from drowsiness as necessary after the preliminary alert is performed;

to detect that the driver has performed a predetermined response operation within a preset time after the preliminary alert is performed;

to change the alert threshold value to be higher in response to that the predetermined response operation is detected; and to perform the preliminary alert randomly in a state where the determined drowsiness level is equal to or less than the alert threshold value, wherein the one or more computers are further configured to lower the alert threshold value in response to that the predetermined response operation by the driver is not detected within a preset time after the randomly performed preliminary alert.

11. The dozing alert apparatus according to claim 10, wherein:

the one or more computers are further configured to perform the preliminary alert randomly in response to that the preliminary alert has not been performed for a preset time or more; and the preset time is enabled to be changed.

12. The dozing alert apparatus according to claim 10, wherein:

the one or more computers are further configured to change the alert threshold value in response to detecting a plurality of response operations consecutively.

13. The dozing alert apparatus according to claim 10, wherein:

the one or more computers are further configured to perform the preliminary alert by asking the driver with an output of a speech based on speech data.

14. The dozing alert apparatus according to claim 13, wherein:

the speech data is configured to be rewritable.

15. The dozing alert apparatus according to claim 10, wherein:

the predetermined response operation by the driver to the preliminary alert includes a predetermined gesture; and the one or more computers are further configured to detect whether the predetermined response operation has been performed based on image recognition by the camera.

16. The dozing alert apparatus according to claim 10, wherein:

the predetermined response operation by the driver to the preliminary alert includes a predetermined speech response; and the one or more computers are further configured to detect whether the predetermined response operation has been performed based on a recognition of a speech acquired by a microphone.

17. The dozing alert apparatus according to claim 10, wherein:

the one or more computers are further configured to perform the main alert that prompts the driver to wake from drowsiness in cooperation with another device mounted on the vehicle.

18. The dozing alert apparatus according to claim 10, wherein:
the one or more computers are further configured to identify the driver, wherein the alert threshold value is set for the identified driver.

* * * * *